United States Patent
Rao et al.

(10) Patent No.: US 11,895,156 B2
(45) Date of Patent: Feb. 6, 2024

(54) SECURING NETWORK RESOURCES FROM KNOWN THREATS

(71) Applicant: Cisco Technology, Inc., San Jose, CA (US)

(72) Inventors: Supreeth Hosur Nagesh Rao, Cupertino, CA (US); Navindra Yadav, Cupertino, CA (US); Tapan Shrikrishna Patwardhan, Mountain View, CA (US); Umamaheswaran Arumugam, San Jose, CA (US); Darshan Shrinath Purandare, Fremont, CA (US); Aiyesha Ma, San Francisco, CA (US); Hongyang Zhang, Mountain View, CA (US); Kai Zhu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/931,595

(22) Filed: Sep. 13, 2022

(65) Prior Publication Data

US 2023/0012641 A1  Jan. 19, 2023

Related U.S. Application Data

(63) Continuation of application No. 17/003,364, filed on Aug. 26, 2020, now Pat. No. 11,483,351.

(51) Int. Cl.
*H04L 9/40* (2022.01)

(52) U.S. Cl.
CPC ............ *H04L 63/20* (2013.01); *H04L 63/101* (2013.01); *H04L 63/145* (2013.01); *H04L 63/1416* (2013.01)

(58) Field of Classification Search
CPC ..... H04L 63/10; H04L 63/14; H04L 63/1408; H04L 63/1416; H04L 63/1441; H04L 63/145; H04L 63/20
See application file for complete search history.

(56) References Cited

U.S. PATENT DOCUMENTS

| 7,630,364 | B2 * | 12/2009 | Stewart ................. H04L 61/255 370/392 |
| 8,595,843 | B1 * | 11/2013 | McCabe ............... G06F 21/566 726/25 |

(Continued)

FOREIGN PATENT DOCUMENTS

| EP | 1682985 A2 | 7/2006 |
| EP | 3314854 A1 | 5/2018 |

OTHER PUBLICATIONS

International Search Report and Written Opinion from the International Searching Authority, dated Dec. 6, 2021, 11 pages, for corresponding International Patent Application No. PCT/US2021/046151.

*Primary Examiner* — Khang Do
(74) *Attorney, Agent, or Firm* — Polsinelli P.C.

(57) ABSTRACT

The present disclosure relates to securing workloads of a network by identifying compromised elements in communication with the network and preventing their access to network resources. In one aspect, a method includes monitoring network traffic at network elements of a network; detecting a compromised element in communication with one or more of the network elements, the compromised element being associated with at least one network threat; and based on a defined network policy, applying one of a number of different access prevention schemes to the compromised element to prevent access to the network by the compromised element.

18 Claims, 8 Drawing Sheets

(56) References Cited

U.S. PATENT DOCUMENTS

| | | |
|---|---|---|
| 8,839,417 B1 | 9/2014 | Jordan |
| 9,027,128 B1 | 5/2015 | Oliver et al. |
| 9,122,546 B1 | 9/2015 | Kaimal |
| 9,569,619 B1 | 2/2017 | Wilhelm et al. |
| 9,894,099 B1 | 2/2018 | Jacobsen et al. |
| 10,230,749 B1 | 3/2019 | Rostami-Hesarsorkh et al. |
| 10,291,645 B1 | 5/2019 | Frantzen et al. |
| 10,771,506 B1 * | 9/2020 | Kumar ................ H04L 63/02 |
| 10,885,393 B1 | 1/2021 | Sirianni |
| 10,951,645 B2 | 3/2021 | Mathew |
| 11,128,665 B1 | 9/2021 | Sokolov et al. |
| 11,477,237 B2 * | 10/2022 | Rogers ............ H04L 63/0236 |
| 2004/0250124 A1 * | 12/2004 | Chesla ............... G06F 21/552 709/224 |
| 2007/0005987 A1 | 1/2007 | Durham et al. |
| 2007/0261112 A1 | 11/2007 | Todd et al. |
| 2007/0294391 A1 | 12/2007 | Kohn |
| 2008/0127338 A1 | 5/2008 | Cho et al. |
| 2008/0229419 A1 * | 9/2008 | Holostov ............ G06F 21/564 726/24 |
| 2012/0072983 A1 * | 3/2012 | McCusker ........... H04L 63/126 726/22 |
| 2012/0257631 A1 | 10/2012 | Nguyen |
| 2013/0007245 A1 | 1/2013 | Malik et al. |
| 2013/0312081 A1 | 11/2013 | Shim et al. |
| 2013/0318343 A1 * | 11/2013 | Bjarnason ........... H04L 41/0809 713/157 |
| 2013/0339545 A1 | 12/2013 | Shenoi et al. |
| 2014/0230062 A1 * | 8/2014 | Kumaran ........... H04L 63/1408 726/24 |
| 2014/0310811 A1 * | 10/2014 | Hentunen ........... H04L 63/1441 726/23 |
| 2014/0373148 A1 * | 12/2014 | Nelms ............... H04L 63/1441 726/23 |
| 2015/0207809 A1 | 7/2015 | Macaulay |
| 2016/0182544 A1 * | 6/2016 | Adjaoute ........... G06Q 30/0185 705/7.15 |
| 2016/0277431 A1 * | 9/2016 | Yu ................... H04L 63/1425 |
| 2016/0330219 A1 | 11/2016 | Hasan |
| 2016/0359872 A1 * | 12/2016 | Yadav ............... H04L 63/1408 |
| 2017/0006082 A1 * | 1/2017 | Shishodia ............ H04L 67/025 |
| 2017/0013018 A1 * | 1/2017 | Nakata .............. H04L 12/6418 |
| 2017/0034185 A1 | 2/2017 | Green |
| 2017/0063902 A1 | 3/2017 | Muddu et al. |
| 2017/0099312 A1 | 4/2017 | Ganame et al. |
| 2017/0244746 A1 | 8/2017 | Hawthorn et al. |
| 2017/0250997 A1 | 8/2017 | Rostamabadi et al. |
| 2017/0251002 A1 | 8/2017 | Rostamabadi et al. |
| 2017/0251003 A1 * | 8/2017 | Rostami-Hesarsorkh ................. G06N 5/01 |
| 2017/0279829 A1 | 9/2017 | Vasseur et al. |
| 2017/0374092 A1 | 12/2017 | Carter |
| 2018/0034642 A1 * | 2/2018 | Kaehler .................... H04L 9/14 |
| 2018/0091548 A1 * | 3/2018 | Jain ................... H04L 63/1458 |
| 2018/0139141 A1 * | 5/2018 | Stepanek ............. H04W 12/122 |
| 2018/0139241 A1 | 5/2018 | Jacobsen et al. |
| 2018/0288074 A1 * | 10/2018 | Thayer ................. G06N 20/00 |
| 2018/0288078 A1 | 10/2018 | Balasundaram et al. |
| 2019/0044912 A1 | 2/2019 | Yang et al. |
| 2019/0166095 A1 | 5/2019 | Tobin |
| 2019/0207976 A1 | 7/2019 | Yadav et al. |
| 2019/0215330 A1 | 7/2019 | Neuvirth et al. |
| 2019/0312887 A1 | 10/2019 | Grimm et al. |
| 2019/0312888 A1 | 10/2019 | Grimm et al. |
| 2020/0014697 A1 * | 1/2020 | Karin .................. G06N 20/00 |
| 2020/0014711 A1 | 1/2020 | Rego et al. |
| 2020/0082081 A1 | 3/2020 | Sarin et al. |
| 2020/0134177 A1 | 4/2020 | Chalmandrier-Perna |
| 2020/0213342 A1 * | 7/2020 | Ahn ................... H04L 63/0227 |
| 2020/0236132 A1 * | 7/2020 | Kottapalli ............. H04L 45/02 |
| 2020/0366689 A1 | 11/2020 | Lotia et al. |
| 2020/0412745 A1 | 12/2020 | Kelly et al. |
| 2021/0006573 A1 | 1/2021 | Britt et al. |
| 2021/0029153 A1 | 1/2021 | Sugimoto et al. |
| 2021/0051162 A1 | 2/2021 | Taylor et al. |
| 2021/0182381 A1 * | 6/2021 | Adams ................. H04L 67/02 |
| 2021/0273953 A1 | 9/2021 | Fellows et al. |
| 2021/0344690 A1 | 11/2021 | Sharifi Mehr |
| 2021/0352088 A1 * | 11/2021 | Adams ............... H04L 63/0876 |
| 2021/0352104 A1 * | 11/2021 | Sampat .............. H04L 63/0236 |
| 2021/0409436 A1 | 12/2021 | Todd et al. |
| 2023/0066454 A1 * | 3/2023 | Hashida ................ G06F 21/00 |
| 2023/0247045 A1 * | 8/2023 | Zegeye ............... H04L 63/1416 726/22 |

\* cited by examiner

SECURING NETWORK RESOURCES FROM KNOWN THREATS

CROSS-REFERENCE TO RELATED APPLICATIONS

The instant application is a Continuation of, and claims priority to, U.S. patent application Ser. No. 17/003,364 entitled SECURING NETWORK RESOURCES FROM KNOWN THREATS, filed Aug. 26, 2020, the contents of which are herein incorporated by reference in its entirety.

TECHNICAL FILED

The subject matter of this disclosure relates in general to the field of computer networks, and more specifically to securing workloads of a network by identifying compromised elements in communication with the network and preventing their access to network resources.

BACKGROUND

With expansion of enterprise networks and their applicability, applications and workloads available on such enterprise networks may be accessed by a various devices. To ensure application and workload security, enterprises must develop and enforce policies which govern accessibility of network workloads. However, enterprises often lack the information which allows them to enforce granular policies for access to specific applications taking into account devices exposure to un-authorized and malicious external resources.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
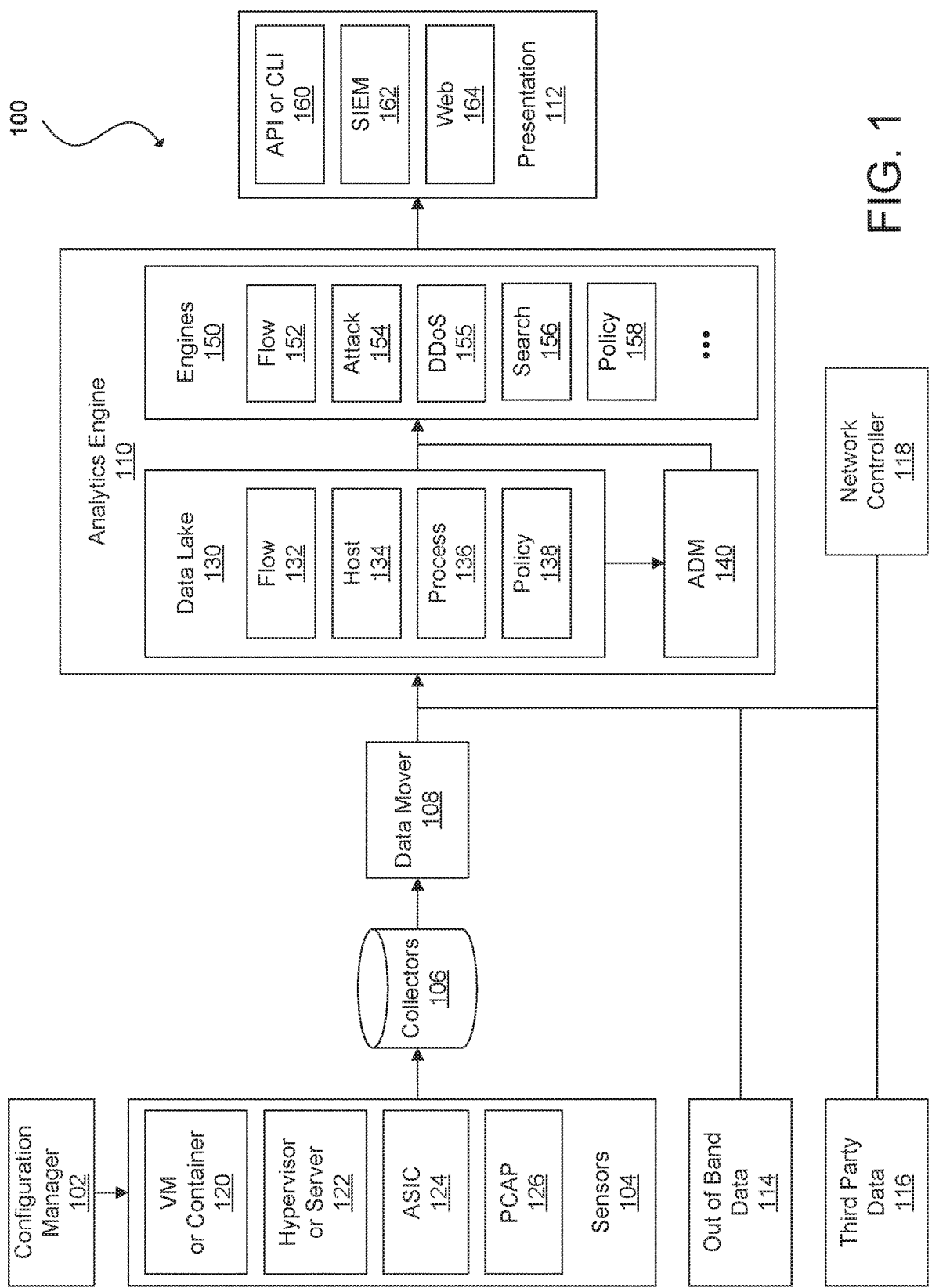
FIG. 1 illustrates an example of a network traffic monitoring system, according to one aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are methods, systems, and non-transitory computer-readable readable media for securing workloads of a network by identifying compromised elements in communication with the network and preventing their access to network resources. More specifically, disclosed are methods, systems and non-transitory computer-readable readable media for applying a dynamic access prevention scheme to compromised element(s) in communication with resources inside the network, based on the nature of the underlying threat detected in connection with the compromised element(s).

In one aspect, a method includes monitoring network traffic at network elements of a network; detecting a compromised element in communication with one or more of the network elements, the compromised element being associated with at least one network threat; and based on a defined network policy, applying one of a number of different access prevention schemes to the compromised element to prevent access to the network by the compromised element.

In another aspect, detecting the compromised element includes identifying the at least one network threat in corresponding network traffic monitored with respect to at least one network element of the network elements; and marking the at least one network element as the compromised element.

In another aspect, identifying the at least one network threat includes receiving a list of known network threats; generating tags for identifying the known network threats; and identifying the at least one network threat using the tags.

In another aspect, the number of different access prevention schemes include blocking the compromised element from accessing at least one network element of the network elements; or quarantining the compromised element for a period of time, wherein the quarantining prevents any communication to and from the compromised element.

In another aspect, the one of the number of different access prevention schemes includes blocking the compromised element from accessing a first workload on one or more of the network elements while allowing the compromised element to access a second workload on the one or more of the network elements.

In another aspect, the network threat is one of a known network IP address or a malware category.

In another aspect, the compromised element is an endpoint registered with the network, the endpoint having accessed an external source having the at least one network threat.

In one aspect, a network element includes one or more memories having computer-readable instructions stored therein and one or more processors. The one or more processors are configured to execute the computer-readable instructions to monitor network traffic at network elements of a network; detect a compromised element in communication with one or more of the network elements, the compromised element being associated with at least one network threat; and based on a defined network policy, apply one of a number of different access prevention schemes to the compromised element to prevent access to the network by the compromised element.

In one aspect, one or more non-transitory computer-readable media include computer-readable instructions, which when executed by one or more processors, cause the one or more processors to monitor network traffic at network elements of a network; detect a compromised element in communication with one or more of the network elements, the compromised element being associated with at least one network threat; and based on a defined network policy, apply one of a number of different access prevention schemes to the compromised element to prevent access to the network by the compromised element.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

The disclosed technology addresses the need in the art for ensuring network security by detecting compromised workloads and endpoints (compromised elements) and preventing partial or complete access to or from the compromised elements, by resources of the network. As will be described below and depending on the nature of the threat detected in connection with a compromised element, a different access prevention scheme may be applied wherein the compromised element can be blocked partially from accessing particular workload(s) in the network, particular node(s) or be completely blocked by being quarantined. Detection of compromised elements may be based on identification of threats using a list of known threats (e.g., known Cyber Threat Alliance (CTA) threats) that identify malicious sources, malicious categories of threats, malicious Universal Resource Locators (URLs), malicious IPs. Such list may be distributed to agents deployed on network nodes that are configured to monitor network traffic and detect the threats.

Figure 6:
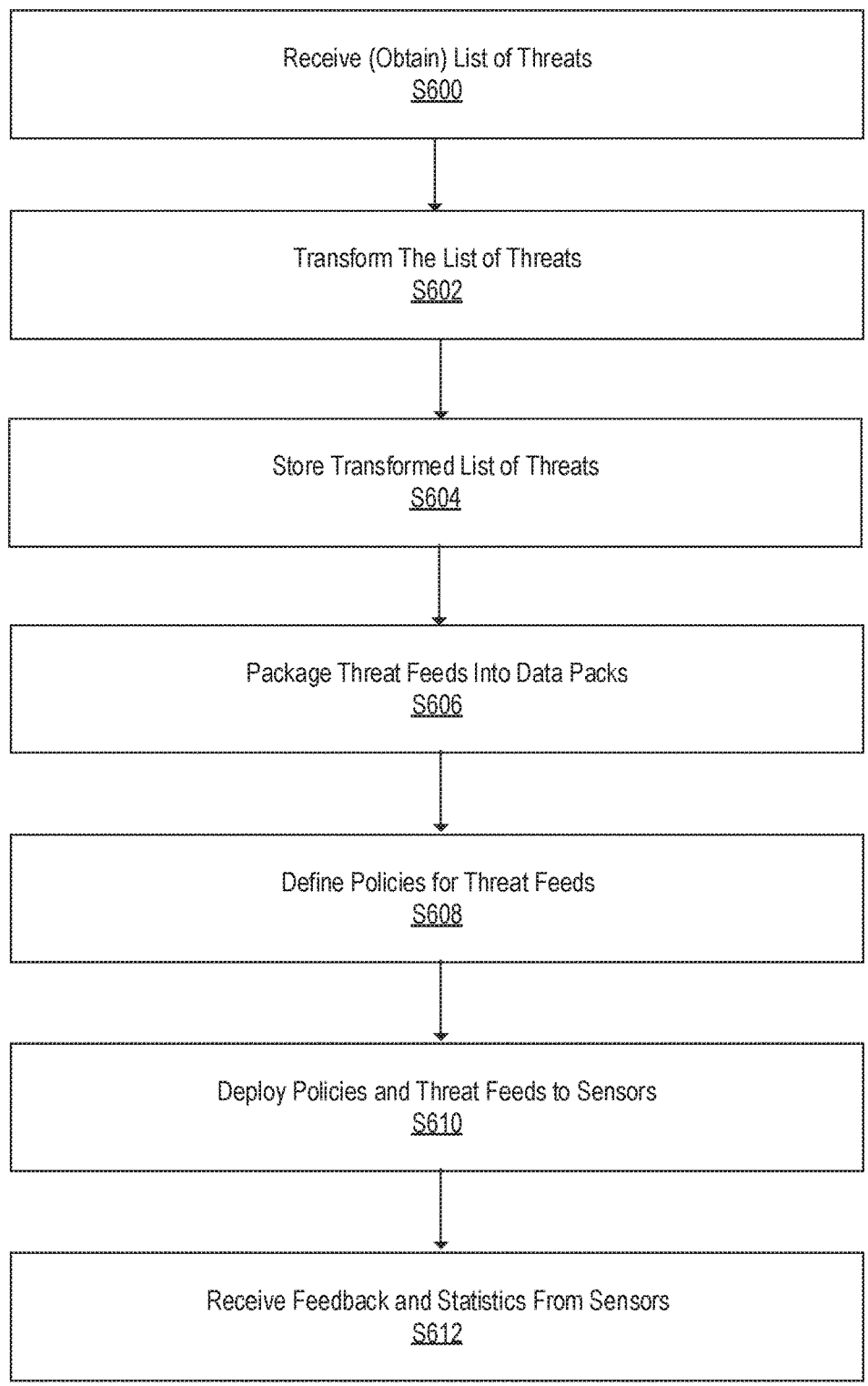
FIG. 6 describes a process for processing and fetching a list of known network threats to network sensors for detecting compromised workloads and endpoints, according to one aspect of the present disclosure.
Figure 7:
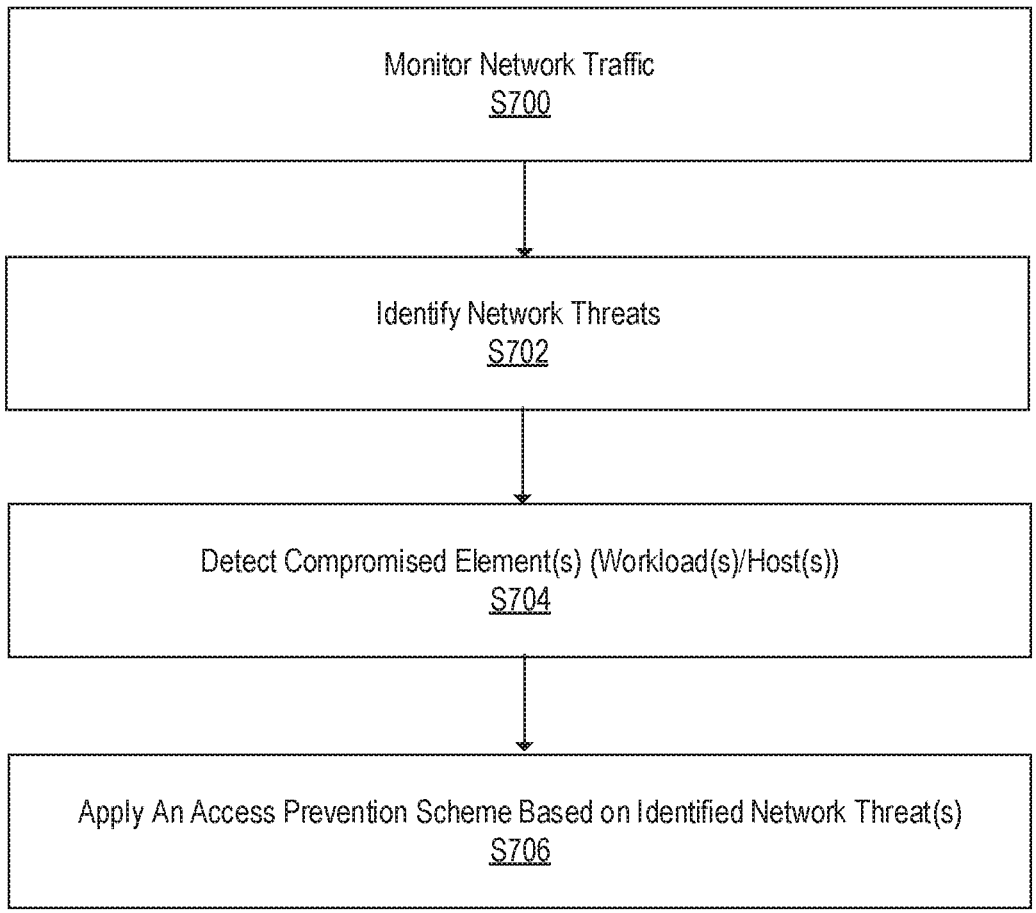
FIG. 7 is an example of network monitoring process for preventing network access from malicious sources, according to one aspect of the present disclosure.

The present technologies will be described in more detail in the disclosure as follows. The disclosure begins with an initial discussion of systems and technologies for monitoring network activity in a network environment with respect to FIGS. 1-3. The discussion will continue with examples of settings in which network elements may be exposed to network threats (FIGS. 4 and 5) followed by processes for setting up a process to identify the network threats and implement a dynamic access prevention scheme when threats are identified (FIGS. 6 and 7). The discussion will conclude with examples of system and device configurations and architectures that can be utilized in the context of the present disclosure as various elements of systems of FIGS. 1-5.

Sensors deployed in a network can be used to gather network information related to network traffic of nodes operating in the network and process information for nodes and applications running in the network. Gathered network information can be analyzed to provide insights into the operation of the nodes in the network, otherwise referred to as analytics. In particular, discovered applications or inventories, application dependencies, policies, efficiencies, resource and bandwidth usage, and network flows can be determined for the network using the network traffic data. For example, an analytics engine can be configured to automate discovery of applications running in the network, map the applications' interdependencies, or generate a set of proposed network policies for implementation.

The analytics engine can monitor network information, process information, and other relevant information of traffic passing through the network using a sensor network that provides multiple perspectives for the traffic. The sensor network can include sensors for networking devices (e.g., routers, switches, network appliances), physical servers, hypervisors or shared kernels, and virtual partitions (e.g., VMs or containers), and other network elements. The analytics engine can analyze the network information, process information, and other pertinent information to determine various network insights.

FIG. 1 illustrates an example of a network traffic monitoring system, according to one aspect of the present disclosure.

The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 may request status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/output system (BIOS) universally unique identifier (UUID) and a secret key stored by the configuration image manager 102. The UUID can be a large number that may be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which may be used as additional data points by the analytics engine 110. Further, collecting network traffic and corresponding data from multiple points of view ensures more accurate data is captured. For example, other types of sensor networks may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by other types of sensor networks. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some embodiments, the network traffic monitoring system 100 can assemble the most accurate flow data set and corresponding data from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 may only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it may be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some embodiments, the network may operate within a trusted environment for a period of time so that the analytics engine 110 can establish a baseline of normal operation. Since malware is constantly evolving and changing, machine learning may be used to dynamically update models for identifying malicious traffic patterns.

In some embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Maryland. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 may instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geo-coordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine may be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine that there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (SIEM) interface 162, and a web front-end 164. As the analytics engine 110 processes network traffic and corresponding data and generates analytics data, the analytics data may not be in a human-readable form or it may be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In some embodiments, the SIEM interface 162 can be implemented using Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
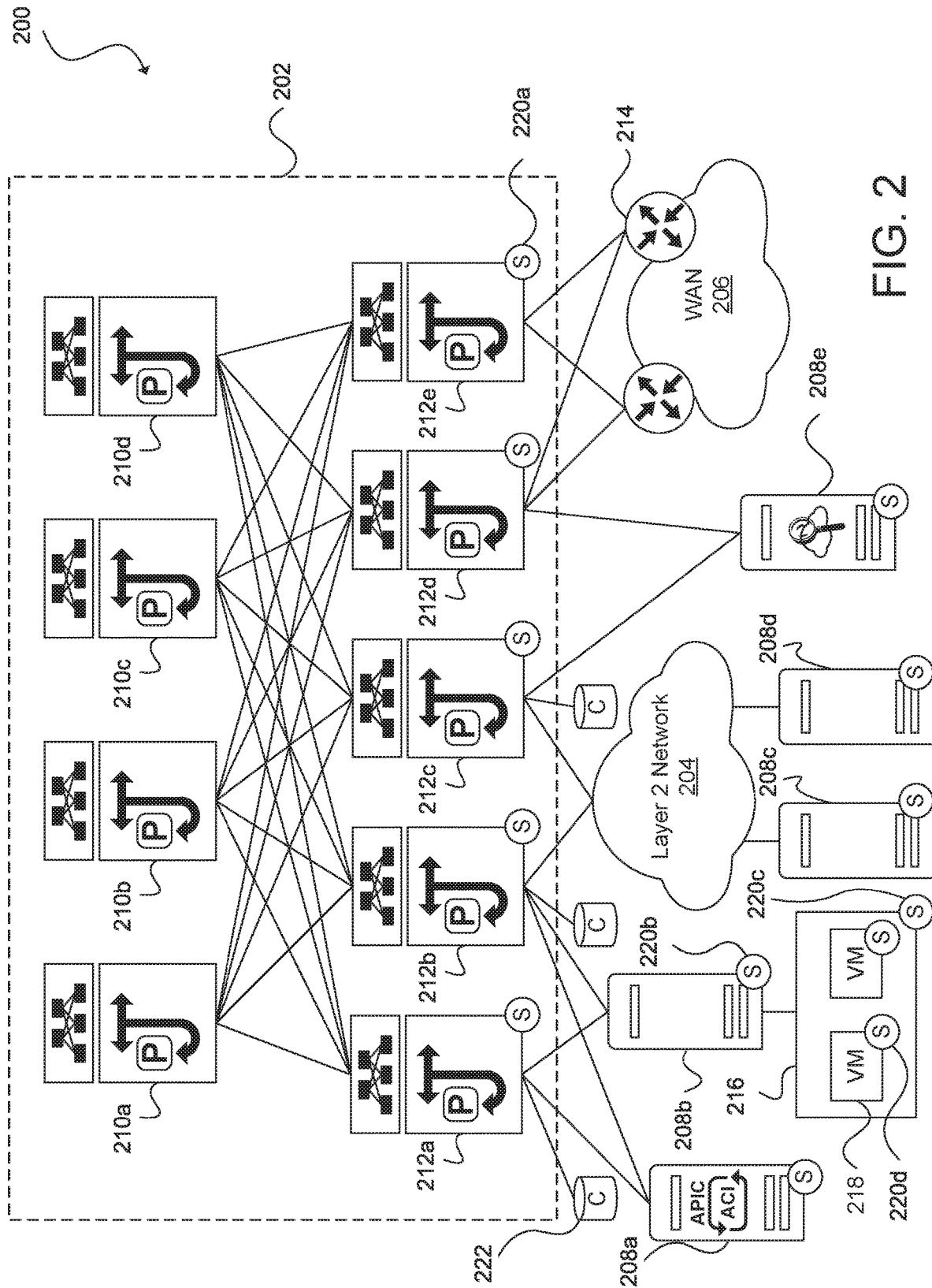
FIG. 2 illustrates an example of a network environment, according to one aspect of the present disclosure.

FIG. 2 illustrates an example of a network environment, according to one aspect of the present disclosure.

In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e may be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and may accommodate a large number of components, as well as more complicated arrangements and configurations. For example, the network may include any number of fabrics 202, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 208 can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 may have instantiated thereon a hypervisor 216 for creating and running one or more virtual switches (not shown) and one or more virtual machines 218, as shown for the host 208b. In other embodiments, physical servers may run a shared kernel for hosting containers. In yet other embodiments, the physical server 208 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine 208e can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts 208 (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host may include multiple sensors 220 running on the host (e.g., the host sensor 220b) and various components of the host (e.g., the hypervisor sensor 220c and the VM sensor 220d) so that all (or substantially all) packets traversing the network environment 200 may be monitored. For example, if one of the VMs 218 running on the host 208b receives a first packet from the WAN 206, the first packet may pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Figure 3:
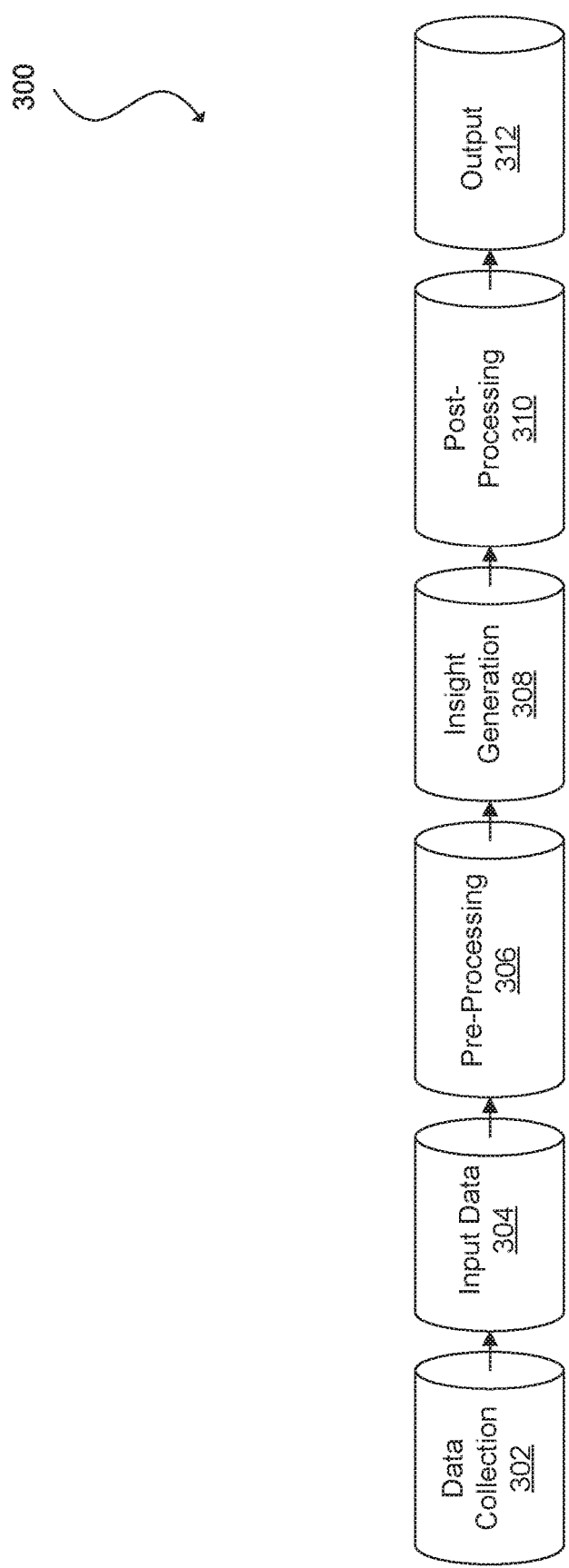
FIG. 3 illustrates an example of a data pipeline for generating network insights based on collected network information, according to one aspect of the present disclosure.

FIG. 3 illustrates an example of a data pipeline for generating network insights based on collected network information, according to one aspect of the present disclosure.

The insights generated from data pipeline 300 may include, for example, discovered applications or inventories, application dependencies, policies, efficiencies, resource and bandwidth usage, network flows and status of devices and/or associated users having access to the network can be determined for the network using the network traffic data. In some embodiments, the data pipeline 300 can be directed by a network traffic monitoring system, such as the network traffic monitoring system 100 of FIG. 1; an analytics engine, such as the analytics engine 110 of FIG. 1; or other network service or network appliance. For example, an analytics engine 110 can be configured to discover applications running in the network, map the applications' interdependencies, generate a set of proposed network policies for implementation, and monitor policy conformance and non-conformance among other network-related tasks.

The data pipeline 300 includes a data collection stage 302 in which network traffic data and corresponding data (e.g., host data, process data, user data, etc.) are captured by sensors (e.g., the sensors 104 of FIG. 1) located throughout the network. The data may comprise, for example, raw flow data and raw process data. As discussed, the data can be captured from multiple perspectives to provide a comprehensive view of the network. The data collected may also include other types of information, such as tenant information, virtual partition information, out-of-band information, third party information, and other relevant information. In some embodiments, the flow data and associated data can be aggregated and summarized daily or according to another suitable increment of time, and flow vectors, process vectors, host vectors, and other feature vectors can be calculated during the data collection stage 302. This can substantially reduce processing.

The data pipeline 300 may also include an input data stage 304 in which a network or security administrator or other authorized user may configure insight generation by selecting the date range of the flow data and associated data to analyze, and those nodes for which the administrator wants to analyze. In some embodiments, the administrator can also input side information, such as server load balance, route tags, and previously identified clusters during the input data stage 304. In other embodiments, the side information can be automatically pulled or another network element can push the side information.

The next stage of the data pipeline 300 is pre-processing 306. During the pre-processing stage 306, nodes of the network are partitioned into selected node and dependency node subnets. Selected nodes are those nodes for which the user requests application dependency maps and cluster information. Dependency nodes are those nodes that are not explicitly selected by the users for an ADM run but are nodes that communicate with the selected nodes. To obtain the partitioning information, edges of an application dependency map (i.e., flow data) and unprocessed feature vectors can be analyzed.

Other tasks can also be performed during the pre-processing stage 306, including identifying dependencies of the selected nodes and the dependency nodes; replacing the dependency nodes with tags based on the dependency nodes' subnet names; extracting feature vectors for the selected nodes, such as by aggregating daily vectors across multiple days, calculating term frequency-inverse document frequency (tf-idf), and normalizing the vectors (e.g., $\ell_2$ normalization); and identifying existing clusters.

In some embodiments, the pre-processing stage 306 can include early feature fusion pre-processing. Early fusion is a fusion scheme in which features are combined into a single representation. Features may be derived from various domains (e.g., network, host, virtual partition, process, user, etc.), and a feature vector in an early fusion system may represent the concatenation of disparate feature types or domains.

Early fusion may be effective for features that are similar or have a similar structure (e.g., fields of TCP and UDP packets or flows). Such features may be characterized as being a same type or being within a same domain. Early fusion may be less effective for distant features or features of different types or domains (e.g., flow-based features versus process-based features). Thus, in some embodiments, only features in the network domain (i.e., network traffic-based features, such as packet header information, number of packets for a flow, number of bytes for a flow, and similar data) may be analyzed. In other embodiments, analysis may be limited to features in the process domain (i.e., process-based features, such as process name, parent process, process owner, etc.). In yet other embodiments, feature sets in other domains (e.g., the host domain, virtual partition domain, user domain, etc.) may be the.

After pre-processing, the data pipeline 300 may proceed to an insight generation stage 308. During the insight generation stage 308, the data collected and inputted into the data pipeline 300 may be used to generate various network insights. For example, an analytics engine 110 can be configured to discover of applications running in the network, map the applications' interdependencies, generate a set of proposed network policies for implementation, and monitor policy conformance and non-conformance among other network-related tasks. Various machine learning techniques can be implemented to analyze feature vectors within a single domain or across different domains to generate insights. Machine learning is an area of computer science in which the goal is to develop models using example observations (i.e., training data), that can be used to make predictions on new observations. The models or logic are not based on theory but are empirically based or data-driven.

After clusters are identified, the data pipeline 300 can include a post-processing stage 310. The post-processing stage 310 can include tasks such as filtering insight data, converting the insight data into a consumable format, or any other preparations needed to prepare the insight data for consumption by an end user. At the output stage 312, the generated insights may be provided to an end user. The end user may be, for example a network administrator, a third-party computing system, a computing system in the network, or any other entity configured to receive the insight data. In some cases, the insight data may be configured to be displayed on a screen or provided to a system for further processing, consumption, or storage.

As noted above, there is a need to improve security of networks such as network environment 200 of FIG. 2 with hundreds to thousands of endpoints and workloads being in continuous communication with one another and/or with sources external to the network. Such external communication can be provide an opportunity for unauthorized access to such networks. Accordingly, one example approach for improving the security of networks is by detecting compromised workloads and endpoints and preventing partial or complete access to or from the compromised workloads and endpoints, by other nodes in the network. As will be described below, the partial or complete prevention of access to compromised workloads and endpoints may be achieved via blocking access to such compromised workloads and endpoints and/or quarantining affected endpoints. Detection of compromised workloads and endpoints may be based on a list of known threats (e.g., known Cyber Threat Alliance (CTA) threats) that identify malicious sources, Universal Resource Locators (URLs), etc. Such list may be distributed to agents deployed on network nodes that are configured to monitoring network traffic and corresponding sources and destinations.

With examples of network traffic monitoring systems, their operations and network environments in which they can be deployed described above, the disclosure now turns to FIGS. 4 and 5, which describe examples of settings in which network elements may be exposed to malicious threats.

Figure 4:
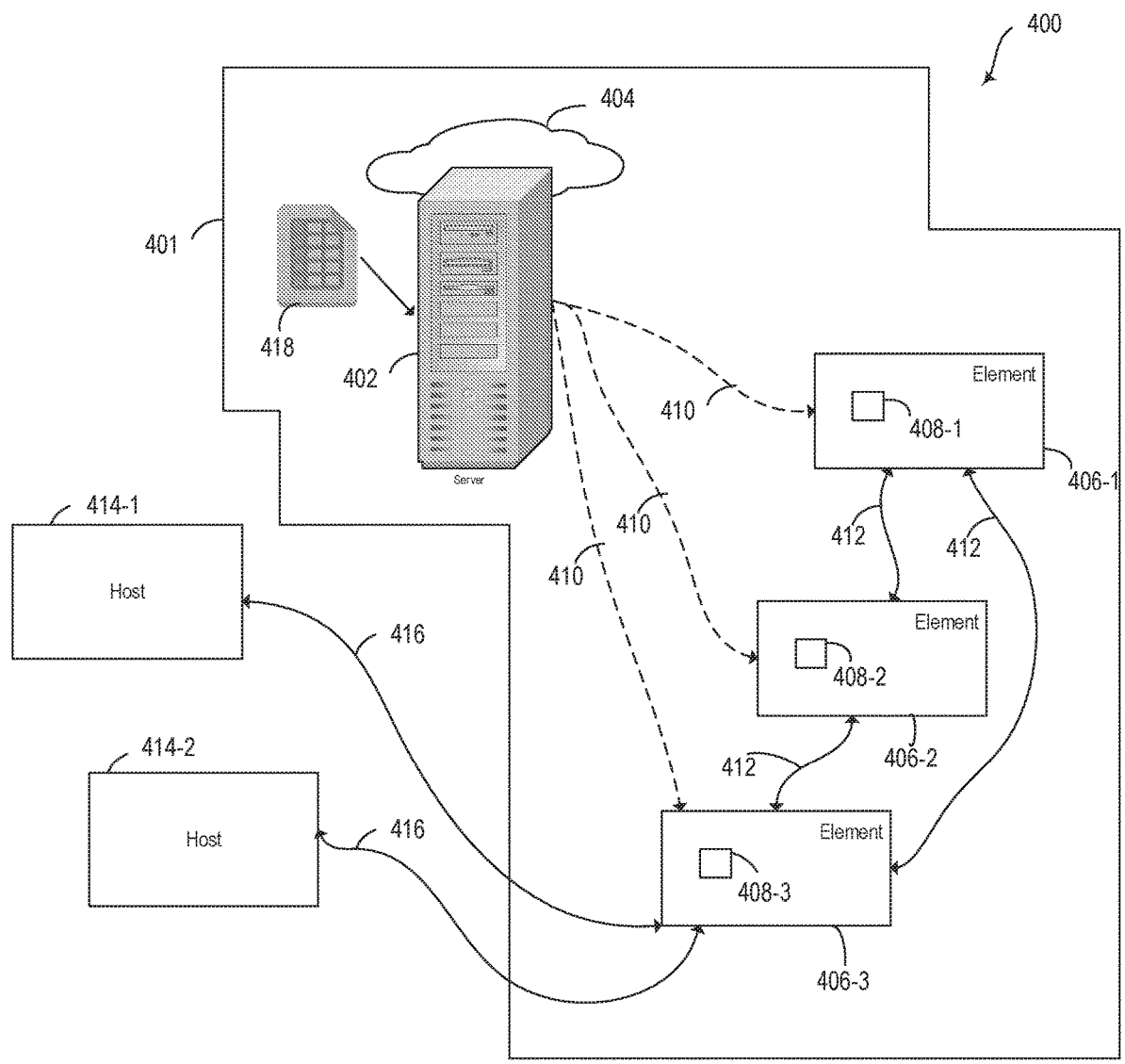
FIG. 4 illustrates a simplified version of a setting in which elements of network environment of FIG. 2 communicate with potential network threats, according to one aspect of the present disclosure.

FIG. 4 illustrates a simplified version of a setting in which elements of network environment of FIG. 2 communicate with potential network threats, according to one aspect of the present disclosure.

Setting 400 can include a networking environment 401 that can be the same as networking environment 200 of FIG. 2 (e.g., a datacenter, an enterprise network, etc.). Network environment 401 can include a number of element such as server 402 accessible via cloud 404. Among other known or to be developed functionalities, server 402 may communicate with one or more network nodes and workloads such as element 401-1, element 406-2 and element 406-3 (collectively referred to as network elements 406). Any given one of network elements 406 can be a network node including, but not limited to, a physical host, a physical server, a network device such as a router, a switch, a virtual server, a hypervisor or shared kernels, a virtual partition (e.g., VMs or containers), etc. Furthermore, network elements 406 can be workloads or segments of a network-wide workload/applications being executed on different hosts or network nodes of setting 400. For example, network elements 406 may corresponding to a Human Resources procurement software utilized by an organization associated with network environment 401, a billing system for such organization, etc.

Each network element 406 may have a corresponding sensor installed thereon. For example, network element 406-1 can have sensor 408-1 installed thereon, network element 406-2 can have sensor 408-2 installed thereon, network element 406-3 can have sensor 408-3 installed thereon, etc. Sensors 408-1, 408-2 and 408-3 may collectively be referred to as sensors 408. Sensors 408 may be the same as sensor 104. Among other functionalities, such as those described above with reference to FIG. 1, sensors 408 may monitor various statistics associated with operations of network elements 406 including, but not limited to, sources and destinations of network traffic to and from network elements 406, etc. Furthermore, sensors 408 may receive updates from server 402 regarding network threats (e.g., malicious IP addresses, categories of threats, malware, etc.). This will be further described below. In cases where a network element 406 is a software package/workload, corresponding sensor 408 may also be a software package installed and executed as part of such workload.

Communications between server 402 and sensors 408 may be via links 410 while communications between network elements 406 may be via links 412. Links 410 and 412 may be any known or to be developed wired and/or wireless communication link enabling uni-directional and/or bi-directional communication connected points thereto.

While in example network environment 401 only three network elements 406 are shown, the present disclosure is not limited thereto and network environment 401 may include many more such network elements 406 (e.g. in the order of tens, hundreds, thousands and/or hundreds of thousands of network elements). Furthermore, while network environment 401 illustrates each network element 406 with a dedicated sensor 408, the present disclosure is not limited thereto. For example, two or more network elements 406 may share a sensor 408 or alternatively, a given network element may have more than one sensor 408 installed thereon.

In example setting 400, network elements 406 may communicate with one or more hosts such as hosts 414-1 and 414-2 (collectively referred to as hosts 414). Hosts 414 may be external to network environment 401 (as shown) or can be internal to network environment 401. For example, hosts 414 can be external servers accessed by one or more network elements 406. In example of FIG. 4, network element 406-3 is shown to be communicating with hosts 414 via links 416, which similar to links 410 and 412 can be any known or to be developed wired and/or wireless communication link enabling uni-directional and/or bi-directional communication connected points thereto. However, the disclosure is not limited thereto and any one of network elements 406 may communicate with/access any one of hosts 414. Furthermore, while FIG. 4 illustrates two hosts 414, the present disclosure is not limited thereto and setting 400 can have any number of hosts 414 with which one or more network elements 406 communicate.

At any given point in time, one or more of hosts 414 may be associated with a network threat that can be a malicious (unauthorized) software, a malware, a known malicious IP address, a source associated with a category of threats, etc. In one example, one or more of hosts 414 may have malicious software running thereon or may have attempted to access a malicious software or host. Such host 414 may be referred to as a compromised host (compromised element). Network environment 401 includes a list 418 (which will be further described below). List 418 may be a list of known threats (e.g., CTA threats described above) that may be periodically obtained by (provided to) server 402. List 418 may be generated using a database of threats via crowdsourcing, etc. Further details regarding list 418 and its availability to server 402 will be described below.

Server 402 may communicate the updated list of known threats to sensors 408. Upon detecting access to compromised hosts by any one of network elements 406, as will be described below, sensors 408 may prevent access to such compromised hosts by network elements 406. For example, in setting 400, host 414-1 may contain a malicious software. Accordingly, host 414-1 may be considered a compromised host. Sensor 408-3 running on network element 406-3 may detect access to compromised host 414-1. As will be described below, since sensor 408-3 is aware of the malicious software or malicious nature of host 414-1 (based on the updated list provided to sensor 408-3 by server 402), sensor 408-3 may cause network element 406-3 to block (break) communication link 416 to and from compromised host 414-1. Such break of communication link 416 may be confined to just compromised host 414-1 and network element 406-3, may include preventing any direct or indirect communication between compromised host 414-1 and any other network element 406 or server 402 in setting 400, etc. Alternatively, compromised host 414-1 may be quarantined (e.g., temporarily) from accessing any resources on setting 400 until the threat associated with compromised host 414-1 is addressed by server 402. This will be further described below. Different types of access prevention will be further described below.

Figure 5:
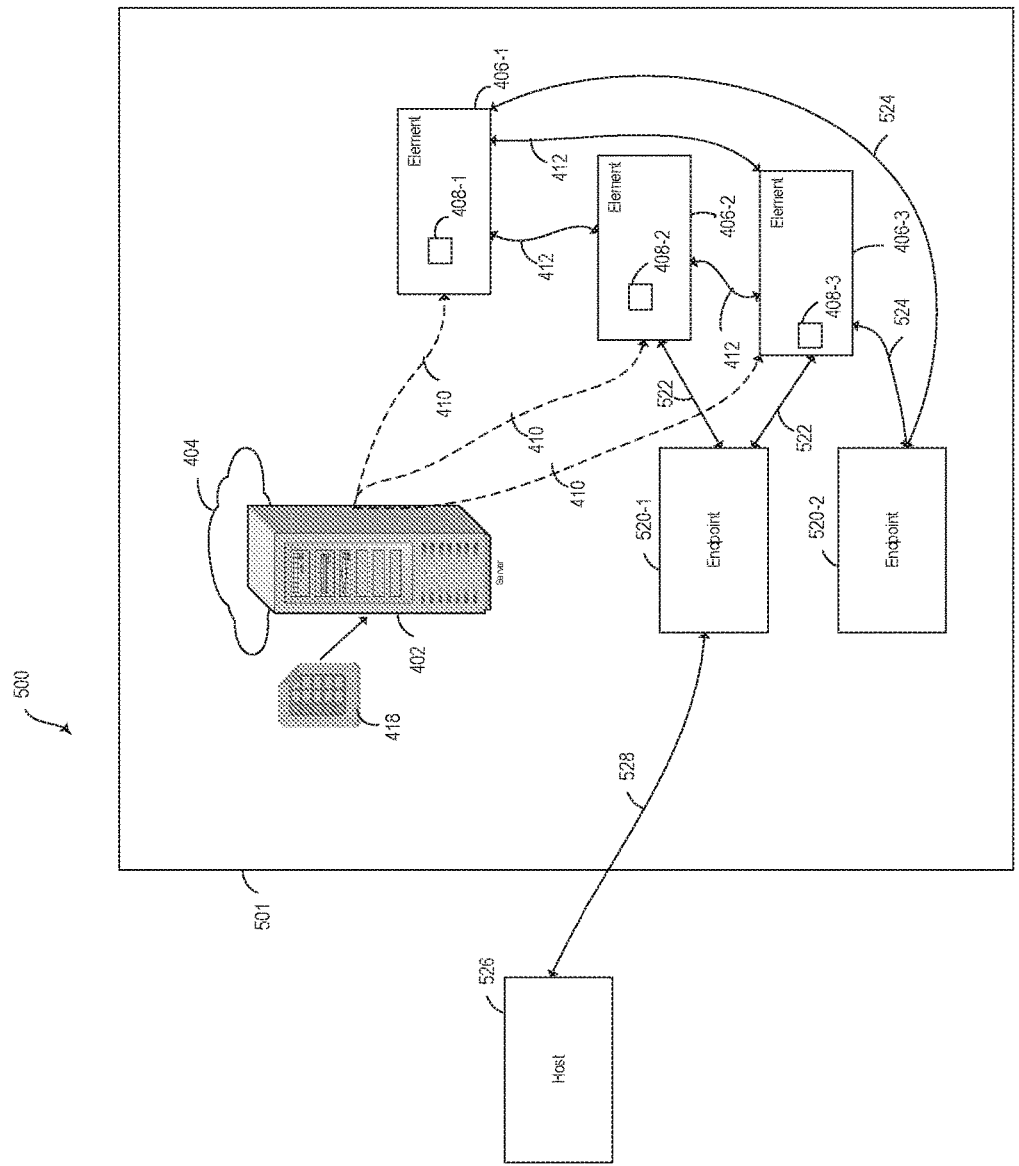
FIG. 5 illustrates another simplified version of a setting in which elements of network environment of FIG. 2 communicate with potential malicious hosts, according to one aspect of the present disclosure.

FIG. 5 illustrates another simplified version of a setting in which elements of network environment of FIG. 2 communicate with potential malicious hosts, according to one aspect of the present disclosure.

Similar to setting 400, setting 500 may include a network environment 501 that can be the same as network environment 401 and therefore elements there that are the same as their counterparts in network environment 401 are numbered the same and thus will not be described further for sake of brevity. For example, server 402 of network environment 501 is the same as server 402 of network environment 401 of FIG. 4, network elements 406 of network environment 501 are the same as network elements 406 of network environment 401 of FIG. 4, etc.

In contrast to network environment 401, network environment 501 includes one or more endpoint 1 520-1 and endpoint 2 520-2 (collectively referred to as endpoints 520). Endpoints 520 can be any known or to be developed device capable of establishing a communication with one or more elements of network environment 501. For example, endpoints 520 can be any one of a mobile phone, a laptop, a tablet, a desktop, an Internet of Things (IoT) device, etc. Endpoints 520 can be registered with network environment 501 according to any known or to be developed method. Endpoints 520 can be physically located in the same location as one in which network environment 501 is deployed or can be remote and communicatively coupled to one or more nodes or elements of network environment 501. For example, endpoints 520 can have remote connection agents (e.g., ANYCONNECT developed by Cisco Inc. of San Jose, Calif.) installed thereon, which upon activation requires corresponding users to provide credentials through the installed agents. Upon authentication, such remote connection agents enable endpoints 520 to remotely access resources of network environment 501.

Endpoints 520 can communicate (e.g., for accessing a workload) with one or more network elements 502. For example, endpoint 520-1 can communicate with network elements 506-2 and 506-3 via communication links 522 (communication links 522 can be the same as communication links 410/412 of FIG. 4 and thus will not be described further). Furthermore, endpoint 520-1 can communicate with network elements 406-1 and 406-3 via communication links 524 (communication links 524 can be the same as communication links 410/412 of FIG. 4 and thus will not be described further).

In setting 500, one or more of endpoints 520 may communicate with an external source such as host 526. For example, while connected to network environment 501 and accessing a workload on network elements 406-2 and 406-3 (e.g., a billing system of an organization associated with network environment 501), a user of endpoint 520-1 may access external host 526 via a website and communication link 528 (communication links 528 can be the same as communication links 410/412 of FIG. 4 and thus will not be described further). Host 526 may have one or more known threats associated therewith such as a malware. Communication with host 526 may result in endpoint 520-1 being considered a compromised endpoint (compromised element). Accordingly, sensors 408-2 and 408-3 running network elements 406-2 and 406-3 may compare access to host 526 by endpoint 520-1 to list 418 and determine that host 526 is a malicious host (a bad host). Accordingly, endpoint 520-1 may be blocked/quarantined so that no communication between elements of network environment 501 and endpoint 520-1 can be established. Such quarantine can be temporary (e.g., for a period of time such as an hour, a day, a week, etc.) or can be permanent (e.g., requiring endpoint 520-1 to be rebooted with original settings, etc.). Different types of access prevention will be further described below.

Next, examples for setting up a process to identify the network threats and implement a dynamic access prevention scheme when threats are identified will be described with reference to FIGS. 6 and 7.

FIG. 6 describes a process for processing and fetching a list of known network threats to network sensors for detecting compromised workloads and endpoints, according to one aspect of the present disclosure.

Process of FIG. 6 will be described from the perspective of server 402 of FIG. 4. However, it should be understood that server 402 may have one or more processors associated therewith that are configured to execute computer-readable instructions to perform the steps of FIG. 6.

At S600, server 402 receives a list of network threats (or simply threats). A list of threats can be a list of known threats (e.g., malicious IP addresses, malwares, etc.) developed by CTA and may be referred to as a CTA list. A CTA or any other list of known threats may be developed using crowd-sourcing, etc. and may be publicly available. Such list may be received (queried by server 402) from any known source such as CTA Amazon Web Services (AWS) Lambda bucket or any other type of source containing such list. In one example, the list of threats may be communicated to server 402 periodically (e.g., once a day, once a week, once a month, etc.) or may be queried by server 402 periodically.

At S602, server 402 transforms the list of network threats. The transformation process may be an optional step and performed to ensure that the format of the data packets containing the threat list information are compatible with existing exchange protocols between server 402 and sensors 408.

At S604, server 402 may store the transformed list of network threats in a database or a storage associated with server 402 (not shown in FIGS. 4 and 5).

At S606, the transformed list of network threats (threat feeds) are packaged into existing data packs exchanged between server 402 and sensors 408. Data packs may include an auxiliary information portion in which threat feeds can be included. Data packs are provided to server 402 and sensors 408 via known external resources. For example, data packs can originate from a cloud headend hosting one or more data jobs in association with which data packs are created and send to server 402.

In one example, packaging of threat feeds into data packs may be done via a feature called a cloud connection. This can be an AWS service that sensors 408 can connect to, via server 402 for example, to fetch the latest data packs. In response to this, sensors 408 can also send back usage statistics about various features back to server 402. In another example, data packets can be packaged into Red Hat Packet Managers (RPMs) that can be downloaded from a website, and uploaded to sensors 408. In one example, an RPM is a mechanism in which data packs are packaged and sent as one unit from cloud headend to server 402. An RPM can be arbitrary set of files that can be sent and dealt on a system such as a UNIX system.

At S608, server 402 can define policies for the threat feeds by creating annotations, which can then be used to tag/identify compromised workloads/endpoints. Such annotation may be a tag identifying a known malicious (bad) IP address on the received list or can be a tag identifying a threat category and source(s) of such category.

For example, a policy can be defined to identify workloads/endpoints that should block connections to a malicious IP address. In such case, as data packets come in to such workloads/endpoints (e.g., network element 406-3 of FIG. 4), the source of the data packet is examined by the corresponding sensor 408 and if the source matches the known malicious IP (e.g., associated with host 414-1), network element 406-3's connection to host 414-1 is taken down/blocked.

At S610, server 402 deploys defined policies and threat feeds to sensors 408 for implementation and prevent access to network resources and elements by compromised workloads/endpoints. This will be further described below reference to FIG. 7

At S612, server 402 may receive continuous feedback from sensors 408 on various statistics collected by sensors 408 on performance and data traffic between their respective network elements 406 and/or other endpoints and hosts inside or external to network environment 401/501. Such statistics may be used by server 402 to further refine/update annotations and policies created for preventing access to network resources by malicious sources and known threats. For example, when sensors 408 detect occurrence of a malware across ten network elements (that can potentially span different across customers), based on such increased occurrence, server 402 can define policies on other network elements to prevent to any host or endpoint on which the malware is detected through a policy action or quarantine any endpoint on which the malware is detected.

FIG. 7 is an example of network monitoring process for preventing network access from malicious sources, according to one aspect of the present disclosure.

FIG. 7 will be described from the perspective of server 402 of FIG. 4. However, it should be understood that server 402 may implement the processes of FIG. 7 using one or more sensors 408.

At S700, using sensors 408, server 402 monitors network traffic between network elements 406 of network environment 401 and one or more endpoints and/or hosts such as hosts 414 and/or endpoints 520.

At S702, using tags associated with defined policies per process of FIG. 6, server 402 identifies a network threat (e.g., a malicious IP address, a malware, etc.) in association with any one of hosts 414 and/or endpoints 520. Such identification may be based on defined bad IP addresses and/or tags associated with malicious categories of malwares, viruses, bugs, known cyber threats, etc., and corresponding resources, as described above with reference to FIG. 6. Host(s) 414, endpoint(s) 520 and/or associated workloads in connection with which malicious address/malware is/are detected, may be referred to as compromised elements.

At S704, server 402 detects compromised element(s) (e.g., workload(s), endpoint(s), etc.) based on identified malicious address(es) and/or malware at S702. In one example, host(s) 414 and/or endpoint(s) 520 in association with which malicious address/malware is detected, is/are referred to as compromised workload(s)/endpoint(s).

At S706, using one or more of sensors 408, server 402 applies an access prevention scheme to each detected compromised element to prevent access to network resources by such compromised elements. Such access prevention scheme can be one a number of available access prevention schemes, each corresponding to a specific policy defined for addressing a different underlying network threat identified in association with a compromised element.

One example access prevention scheme can be to block a particular connection between a compromised host/workload and one or more specific workloads in network environment 401. This may be referred to as a network element based access prevention scheme. For example, as described with reference to FIG. 4, connection between host 414 and network element 406-3 may be terminated/blocked.

Another example access prevention scheme can be to quarantine a compromised host/workload as described above. This can be referred to as a quarantine-based access prevention scheme. For example, a policy may be created based on a threat category and/or source of such category. Such policy may be to quarantine compromised element(s). For example, a policy may be created to dictate that when an endpoint accesses an advertisement host with a specific ad-tag (e.g., endpoint 520-1 accessing host 526 in FIG. 5), and the tag-ad is detected in a data packet received at network element 406-2 and/or 406-3, then endpoint 520-1 should be quarantined. As mentioned such policy may also define a period for the quarantine. Such period may be determined based on experiments and/or empirical studies Another example access prevention scheme can be such that, depending on the nature of the underlying malware or threat, access by a compromised host/endpoint is blocked to a particular workload on a particular network element 406 while the same compromised workload/endpoint can still access other workloads on that particular network element 406. This policy may be defined to address situations where a particular category of threats or a particular IP address is considered harmful to one workload but not to others. This can be referred to as a workload-based access prevention scheme. For example, network element 406-1 may have multiple applications or workloads running thereon. An external sourced accessed may be a threat to a first application running on network element 406-1 but not to a second application running on network element 406-1. A policy can be defined to dictate that while access to the first application on network element 406-1 should be blocked, access to the second application on the same network element 406-1 should be allowed.

Accordingly, at S706, server 402 dynamically applies an access prevention scheme based on the nature of the underlying network threat. This dynamic application of access prevention addresses each unique threat differently instead of a uniform application of a single type of access prevention to all compromised hosts/endpoints. Accordingly, a more efficient access prevention process is provided that results in more efficient use and better performance of network environment 401. This advantage is highlighted by the fact that if a uniform access prevention is applied may connections may be blocked or many endpoints may be quarantined that would otherwise not be when the nature of the underlying threat is taken into consideration.

Thereafter, the process reverts back to S700 and S700, S702, S704 and S706 are repeated periodically (or alternatively, continuously) to detect compromised hosts/endpoints and prevent Next, example device and system configurations are described that can be utilized in the context of the present disclosure as various elements of systems of FIGS. 1-5 (e.g., server 402, network elements 406, sensors 408, hosts 414, endpoints 520, etc.), to implement example functionalities and processes described with reference to FIGS. 6 and 7.

Figure 8:
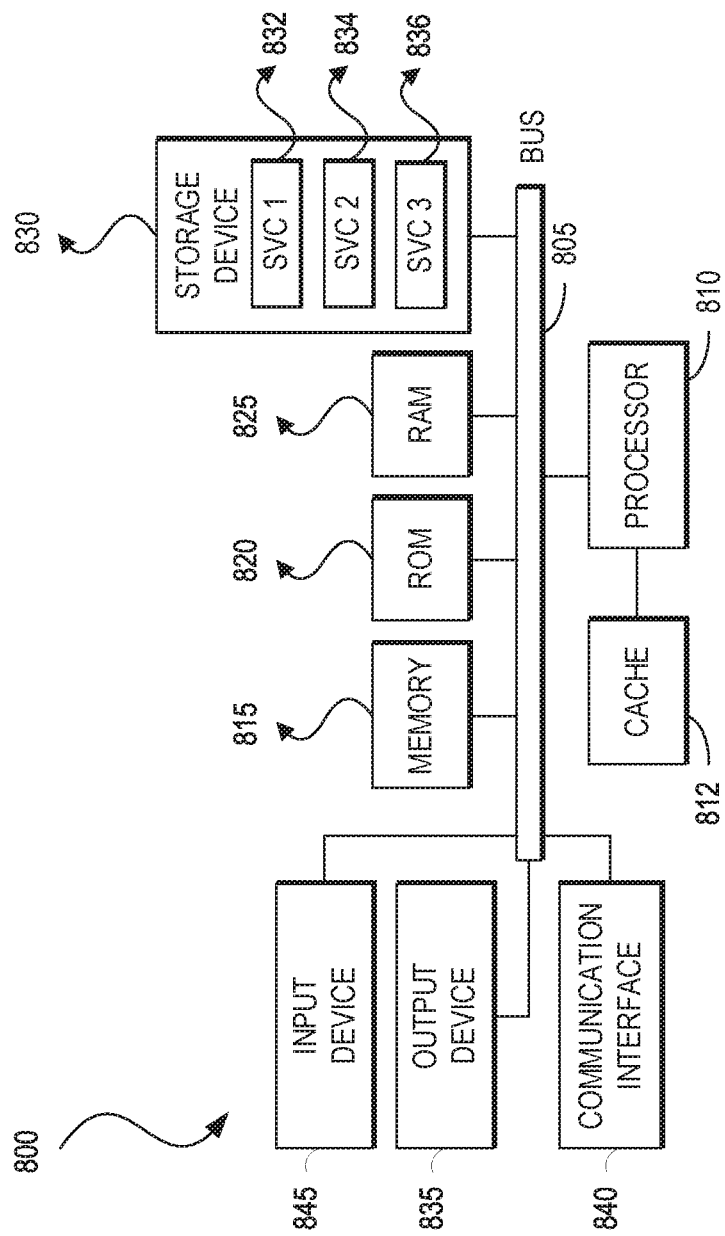
FIG. 8 illustrates an example computing system, according to one aspect of the present disclosure.

FIG. 8 illustrates an example computing system, according to one aspect of the present disclosure.

FIG. 8 shows an example of computing system 800, which can be for example any computing device making up authentication service 415 or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving a list of network threats;
transforming the list of network threats into a format compatible with existing exchange protocols between a server and sensors of a network;
packaging the transformed list into existing data packs exchanged between the server and the sensors;
defining policies for the threats by creating annotations to tag compromised network elements;
deploying the defined policies and the existing data packs with the transformed list of threats feeds to the sensors;
collecting continuous feedback from the sensors on various statistics collected by the sensors on performance and data traffic between their respective network elements; and
updating the policies based upon the collected statistics.

2. The method of claim 1, further comprising:
detecting, a compromised network element in communication with one or more other network elements, the compromised network element being associated with at least one network threat.

3. The method of claim 2, wherein the compromised network element is an endpoint registered with the network, the endpoint having accessed an external source having the at least one network threat.

4. The method of claim 2, further comprising:
tagging the compromised network element with a tag from one of the policies.

5. The method of claim 4, further comprising:
based on the defined policies, applying by the server through the sensors one of a number of different access prevention schemes to the compromised network element to prevent access to the network by the compromised network element.

6. The method of claim 2, further comprising:
based on the defined policies, applying by the server through the sensors one of a number of different access prevention schemes to the compromised network element to prevent access to the network by the compromised network element.

7. A system, comprising:
a non-transitory computer readable media storing instructions; and
a processing component comprising software in combination with electronic computer hardware programmed to cooperate with the instruction to perform operations including:
receive a list of network threats;
transform the list of network threats into a format compatible with existing exchange protocols between a server and sensors of a network;
package the transformed list into existing data packs exchanged between the server and the sensors;
define policies for the threats by creating annotations to tag any compromised network elements;
deploy the defined policies and the existing data packs with the transformed list of threats feeds to the sensors;
collect continuous feedback from the sensors on various statistics collected by the sensors on performance and data traffic between their respective network elements; and
update the policies based upon the collected statistics.

8. The system of claim 7, the operations further comprising:
detecting, a compromised network element in communication with one or more other network elements, the compromised network element being associated with at least one network threat.

9. The system of claim 8, wherein the compromised network element is an endpoint registered with the network, the endpoint having accessed an external source having the at least one network threat.

10. The system of claim 8, the operations further comprising:
tagging the compromised network element with a tag from one of the policies.

11. The system of claim 10, the operations further comprising:
based on the defined policies, applying by the server through the sensors one of a number of different access prevention schemes to the compromised network element to prevent access to the network by the compromised network element.

12. The system of claim 8, the operations further comprising:
based on the defined policies, applying by the server through the sensors one of a number of different access prevention schemes to the compromised network element to prevent access to the network by the compromised network element.

13. A non-transitory computer readable media storing instructions which when executed by a processor cause the processor to perform operations comprising:
receive a list of network threats;
transform the list of network threats into a format compatible with existing exchange protocols between a server and sensors of a network;
package the transformed list into existing data packs exchanged between the server and the sensors;
define policies for the threats by creating annotations to tag any compromised network elements;
deploy the defined policies and the existing data packs with the transformed list of threats feeds to the sensors;
collect continuous feedback from the sensors on various statistics collected by the sensors on performance and data traffic between their respective network elements; and
update the policies based upon the collected statistics.

14. The non-transitory computer readable media of claim 13, the operations further comprising:
detecting, a compromised network element in communication with one or more other network elements, the compromised network element being associated with at least one network threat.

15. The non-transitory computer readable media of claim 14, wherein the compromised network element is an endpoint registered with the network, the endpoint having accessed an external source having the at least one network threat.

16. The non-transitory computer readable media of claim 14, the operations further comprising:
tagging the compromised network element with a tag from one of the policies.

17. The non-transitory computer readable media of claim 16, the operations further comprising:
based on the defined policies, applying by the server through the sensors one of a number of different access prevention schemes to the compromised network element to prevent access to the network by the compromised network element.

18. The non-transitory computer readable media of claim 14, the operations further comprising:
based on the defined policies, applying by the server through the sensors one of a number of different access prevention schemes to the compromised network element to prevent access to the network by the compromised network element.

* * * * *